(12) United States Patent
Moon et al.

(10) Patent No.: US 9,283,957 B2
(45) Date of Patent: Mar. 15, 2016

(54) HYDRAULIC PRESSURE INSTRUCTION-LEARNING APPARATUS FOR HYBRID VEHICLE AND METHOD USING THE SAME

(71) Applicants: HYUNDAI MOTOR COMPANY, Seoul (KR); Kia Motors Corporation, Seoul (KR); SNU R&DB FOUNDATION, Seoul (KR)

(72) Inventors: Seongwook Moon, Seoul (KR); Daero Park, Hwaseong-si (KR); Seok Min Jeong, Suwon-si (KR); Jae Ho Lee, Yongin-si (KR); Jung Un An, Chungju-si (KR); Hee Yun Lee, Seoul (KR); Won Sik Lim, Seoul (KR); Nam Woong Kim, Guri-si (KR); Kyo Bum Lee, Seongnam-si (KR); Howon Seo, Seoul (KR); Suk-Won Cha, Seoul (KR)

(73) Assignees: HYUNDAI MOTOR COMPANY, Seoul (KR); KIA MOTORS CORPORATION, Seoul (KR); SNU R&DB FOUNDATION, Seoul (KR)

( * ) Notice: Subject to any disclaimer, the term of this patent is extended or adjusted under 35 U.S.C. 154(b) by 0 days.

(21) Appl. No.: 14/551,954

(22) Filed: Nov. 24, 2014

(65) Prior Publication Data

US 2015/0266468 A1    Sep. 24, 2015

(30) Foreign Application Priority Data

Mar. 19, 2014    (KR) .................. 10-2014-0032290

(51) Int. Cl.
*B60W 20/00*    (2006.01)
*F16D 48/06*    (2006.01)
(Continued)

(52) U.S. Cl.
CPC .............. *B60W 20/40* (2013.01); *B60W 10/02* (2013.01); *B60W 10/06* (2013.01);
(Continued)

(58) Field of Classification Search
CPC .............. F16D 2500/70217; F16D 2500/1045; F16D 2500/1026; F16D 2500/50266; F16D 2500/3024; F16D 2500/1107; F16D 2500/10412; F16D 48/066; Y10S 903/93; B60W 20/40; B60W 10/06; B60W 10/02; B60W 30/18027
See application file for complete search history.

(56) References Cited

U.S. PATENT DOCUMENTS

| 7,255,664 B2 | 8/2007 | Ohta |
| 2007/0132423 A1* | 6/2007 | Ajima et al. .............. H02P 6/10 318/719 |

(Continued)

FOREIGN PATENT DOCUMENTS

| JP | 2013-119934 A | 6/2013 |
| KR | 10-2009-0061752 A | 6/2009 |

(Continued)

*Primary Examiner* — James Trammell
*Assistant Examiner* — James E Stroud
(74) *Attorney, Agent, or Firm* — McDermott Will & Emery LLP

(57) ABSTRACT

A hydraulic pressure instruction-learning apparatus of a hybrid vehicle includes a power source including an engine and a motor. The engine clutch is disposed between the engine and the motor. The vehicle controller is configured to output a hydraulic pressure instruction to control engagement/disengagement of the engine clutch. The vehicle controller compares output performance of the engine clutch with predetermined dynamic target performance in a launch control, extracts a performance error function if a difference therebetween exceeds a predetermined allowable error range, and corrects the output performance of the engine clutch, such that the output performance falls within the predetermined allowable error range and is stored as a learned value.

18 Claims, 11 Drawing Sheets

(51) Int. Cl.
*B60W 30/18* (2012.01)
*B60W 10/02* (2006.01)
*B60W 10/06* (2006.01)

(52) U.S. Cl.
CPC ...... *B60W 30/18027* (2013.01); *F16D 48/066* (2013.01); *F16D 2500/1026* (2013.01); *F16D 2500/1045* (2013.01); *F16D 2500/1066* (2013.01); *F16D 2500/10412* (2013.01); *F16D 2500/1107* (2013.01); *F16D 2500/3024* (2013.01); *F16D 2500/30803* (2013.01); *F16D 2500/3127* (2013.01); *F16D 2500/3144* (2013.01); *F16D 2500/50224* (2013.01); *F16D 2500/50266* (2013.01); *F16D 2500/5102* (2013.01); *F16D 2500/5108* (2013.01); *F16D 2500/7027* (2013.01); *F16D 2500/7041* (2013.01); *F16D 2500/70217* (2013.01); *F16D 2500/70282* (2013.01); *F16D 2500/70406* (2013.01); *F16D 2500/70448* (2013.01); *F16D 2500/70605* (2013.01); *Y10S 903/93* (2013.01)

(56) References Cited

U.S. PATENT DOCUMENTS

2010/0114442 A1\* 5/2010 Kadota ............. B60W 50/0098
  701/68
2012/0067690 A1\* 3/2012 Postic et al. .......... F16D 48/066
  192/85.63
2012/0095658 A1\* 4/2012 Yasui .................. F02D 41/1403
  701/60

FOREIGN PATENT DOCUMENTS

KR  10-2010-0056943 A  5/2010
KR  10-2012-0000951 A  1/2012

\* cited by examiner

HYDRAULIC PRESSURE INSTRUCTION-LEARNING APPARATUS FOR HYBRID VEHICLE AND METHOD USING THE SAME

CROSS-REFERENCE TO RELATED APPLICATION

This application claims the benefit of priority to Korean Patent Application No. 10-2014-0032290 filed in the Korean Intellectual Property Office on Mar. 19, 2014, the entire contents of which are incorporated herein by reference.

TECHNICAL FIELD

The present disclosure relates to a hydraulic pressure instruction-learning apparatus of a hybrid vehicle and a method using the same, and more particularly, to a hydraulic pressure instruction-learning apparatus of a hybrid vehicle and a method using the same for enabling engagement of an engine clutch to track a target time and a target speed by learning and correcting a hydraulic pressure instruction under a condition where hydraulic and frictional characteristics of the engine clutch vary.

BACKGROUND

Due to high demands in fuel efficiency of a vehicle and more strict regulations of exhaust gases, demands for environmentally-friendly vehicles have been increasing, and hybrid vehicles have been provided as a practical alternative in response thereto.

As a power source, an engine and a motor are applied to the hybrid vehicle, and depending on driving conditions, features of the engine and the motor are embodied to provide fuel efficiency and reduction of exhaust gas.

The hybrid vehicle may provide an optimal output torque depending on how two power sources consisting of the engine and the motor are harmoniously operated.

The hybrid vehicle generally starts by driving the motor, under a condition where a state of charge (SOC) of a battery cannot generate a motor torque sufficient enough to start the vehicle, the engine is turned on to be controlled in an idle state, and then an engine clutch is engaged to start the vehicle with an engine torque that is transferred through the engine clutch.

In this case, when the torque transferred through the engine clutch, which is an assumed model value based on a current hydraulic pressure output, is different from the real torque due to disturbances including a kiss-point of the engine clutch, a friction coefficient, a load, oil temperature, etc., it has an adverse effect on operating ranges of the vehicle.

As a method for correcting characteristics of the engine clutch, a technology is provided in which experimentally acquired friction characteristics of the engine clutch are inputted as a friction coefficient to estimate a transfer torque, and when input and output revolution per minutes (RPMs) of the engine clutch are estimated, and the estimated RPMs differ from set RPMs, a closest characteristic curve actually generated in an characteristics map is selected to correct the friction characteristics.

The above characteristics correction method may have errors with a real transfer torque in selecting the characteristic map, and may have difficulties in dealing with an operation time delay of a hydraulic pressure rather than the friction characteristics of the engine clutch and the like.

Further, it is difficult to take differences of the respective engine clutches into account, and may cause a problem that the motor must be operable to estimate friction characteristic variation of the engine clutch.

As a learning method of a kiss-point (i.e., a real working pressure of the hydraulic pressure), a technology is provided in which an engine at deceleration maintains a fuel-cut control in an electric vehicle (EV) mode, the hydraulic pressure is applied to an engine clutch, and the time until which the engine speed is generated is measured. The measured time is compared with a predetermined target time, and a correction hydraulic pressure is calculated according to a time difference. The learned initial hydraulic pressure is subtracted by the calculated correction hydraulic pressure such that it is updated to be stored, and the updated and stored initial hydraulic pressure is applied when the engine clutch is combined.

The above method is a technology for defining an offset hydraulic pressure to generate the real transfer torque of the engine clutch, and hydraulic pressure characteristics should be considered in determining an amount of learning, and thus, the amount of learning may be dependent on driving conditions, thereby being unable to provide learning control according to load variation.

The above information disclosed in this Background section is only for enhancement of understanding of the background of the invention, and therefore, it may contain information that does not form the prior art that is already known in this country to a person of ordinary skill in the art.

SUMMARY

The present disclosure provides engagement of an engine clutch that is capable of learning to correct a hydraulic pressure instruction through an error analysis between real output performance and dynamic target performance when hydraulic pressure and friction characteristics vary, and thus, an inadequate mechanical behavior occurs due to disturbances including a kiss-point, a friction coefficient, a unit difference, an oil temperature, etc. of the engine clutch.

According to an exemplary embodiment of the present disclosure, a hydraulic pressure instruction-learning apparatus of a hybrid vehicle includes a power source including an engine and a motor. An engine clutch is disposed between the engine and the motor. A vehicle controller is configured to output a hydraulic pressure instruction to control engagement/disengagement of the engine clutch. The vehicle controller may compare output performance of the engine clutch with predetermined dynamic target performance in a launch control, extract a performance error function if a difference therebetween exceeds a predetermined allowable error range, and correct the output performance of the engine clutch, such that the output performance falls within the predetermined allowable error range and is stored as a learned value.

The vehicle controller may set a control, in which a friction torque of the engine clutch is used to run the vehicle when the motor is unable to output a sufficient driving power, as the launch control.

The vehicle controller may approximate the performance error function as a quadratic function to define an initial hydraulic pressure for initiating the engagement of the engine clutch as a first-order component, a slope as a second-order component, and a curvature as a third-order component. The vehicle controller may set compensation points of the hydraulic pressure instruction according to the respective components of the corresponding orders, compensate performance errors for the respective compensation points, and store a compensated value as a learned value of the hydraulic pressure instruction of the engine clutch.

The vehicle controller may separate the performance error function according to respective components to determine compensation points of the hydraulic pressure instruction, analyze performance variation according to a correction of hydraulic pressure instruction, and store a corrected value as a learned value of the hydraulic pressure instruction if the performance variation falls within the predetermined allowable error range.

The vehicle controller may learn the hydraulic pressure instruction according to an oil temperature of a transmission, a road slope, and a displacement amount (opening) of an accelerator pedal, and store a learned value as in a map form.

The vehicle controller may determine an acceleration of the vehicle by an input amount of an accelerator pedal in the launch control, convert the acceleration into a transmission gear ratio to determine a target speed of an input shaft of a transmission, and determine a target speed-tracking hydraulic pressure instruction to control the engagement of the engine clutch.

The vehicle controller may determine a displacement amount (opening) of an accelerator pedal and a target speed according thereto as an initial hydraulic pressure instruction, when there is a learned value of a hydraulic pressure instruction of the engine clutch.

The vehicle controller may correct an initial hydraulic pressure such that the initial hydraulic pressure falls within the predetermined allowable error range if an initial error of a first-order component corresponding to start of engaging the engine clutch exceeds the predetermined allowable error range, and store the initial hydraulic pressure as the learned value of the initial hydraulic pressure if the initial error does not exceed the predetermined allowable error range.

The vehicle controller may correct the compensated hydraulic pressure such that the compensated hydraulic pressure falls within an allowable range if a linear error of a second-order component corresponding to a slope in the hydraulic pressure instruction for engaging the engine clutch exceeds the predetermined allowable error range, and store the compensated hydraulic pressure as the learned value if the linear error does not exceed the predetermined allowable error range.

The vehicle controller may correct a hydraulic pressure slope at a torque transfer range such that the hydraulic pressure slope falls within an allowable range if a curvature error of a third-order component corresponding to the torque transfer range of the engine clutch exceeds the predetermined allowable error range, and store the hydraulic pressure slope at the torque transfer range as the learned value if the curvature error does not exceed the predetermined allowable error range.

The vehicle controller may correct a hydraulic pressure slope right before completion of engagement within an allowable range if a peak slope at the engagement of the engine clutch exceeds the predetermined allowable error range because of a friction characteristic variation of the engine clutch, and store the hydraulic pressure slope right before completion of the engagement as the learned value if the peak slope does not exceed the predetermined allowable error range.

According to another exemplary embodiment of the present disclosure, a hydraulic pressure instruction-learning method of a hybrid vehicle includes turning on an engine in an idle state when a launch control condition is satisfied and determining an acceleration of the vehicle with an input amount of an accelerator pedal. The acceleration is converted into a transmission gear ratio to determine a target speed of an input shaft of a transmission. A hydraulic pressure instruction for tracking the target speed is determined, and engagement of an engine clutch is controlled. An output speed of the engine clutch is compared with the target speed of the input shaft of the transmission to determine whether or not a performance error exceeds a predetermined allowable error range. The performance error function is approximated by using a quadratic function to divide it into respective components, and the divided components are determined as compensation points of the hydraulic pressure instruction. The hydraulic pressure instruction is adjusted according to the respective compensation points to analyze output performance variation of the engine clutch, and the corresponding hydraulic pressure instruction is stored as a learned value if the output performance of the engine clutch tracks the target speed of the input shaft of the transmission.

The launch control condition may refer to a control condition of launching the vehicle by using a friction torque of the engine clutch if a motor is unable to output a sufficient driving power because of a state of charge (SOC) of a battery, a road condition, or a road gradient.

The performance error function may be approximated as the quadratic function, such that an initial hydraulic pressure corresponding to start of the engagement of the engine clutch is defined as a first-order component, a range corresponding to a slope is defined as a second-order component, and a range corresponding to a curvature is defined as a third-order component.

An initial hydraulic pressure may be corrected such that the output performance of the engine clutch tracks the target speed if an error of a first-order component corresponding to start of engaging the engine clutch exceeds the predetermined allowable error range, and the initial hydraulic pressure may be stored as the learned value if the error does not exceed the predetermined allowable error range.

A compensated hydraulic pressure may be corrected such that the output performance of the engine clutch tracks the target speed if a linear error of a second-order component corresponding to a slope in the hydraulic pressure instruction for engaging the engine clutch exceeds the predetermined allowable error range, and the compensated hydraulic pressure may be stored as the learned value if the linear error does not exceed the predetermined allowable error range.

A hydraulic pressure slope may be corrected such that the output performance of the engine clutch tracks the target speed if a curvature error of a third-order component corresponding to a torque transfer range of the engine clutch exceeds the predetermined allowable error range, and the hydraulic pressure slope at the torque transfer range may be stored as the learned value if the curvature error does not exceed the predetermined allowable error range.

A hydraulic pressure slope right before completion of the engagement of the engine clutch may be corrected such that the output performance of the engine clutch tracks the target speed if a peak slope at the engagement of the engine clutch exceeds a predetermined allowable range because of friction characteristic variation of the engine clutch, and the hydraulic pressure slope right before the completion of the engagement may be stored as the learned value if the peak slope does not exceed the predetermined allowable range.

As described above, through the error analysis between the real output performance and the dynamic target performance, the present disclosure may learn the hydraulic pressure instruction with the reduced number of learning events, when estimation or measurement of the kiss-point of the engine clutch, the friction coefficient, and a load are not correct, and thus, an inadequate mechanical behavior occurs, thereby providing convenience and reliability in learning the hydraulic pressure instruction.

DETAILED DESCRIPTION

Figure 1:
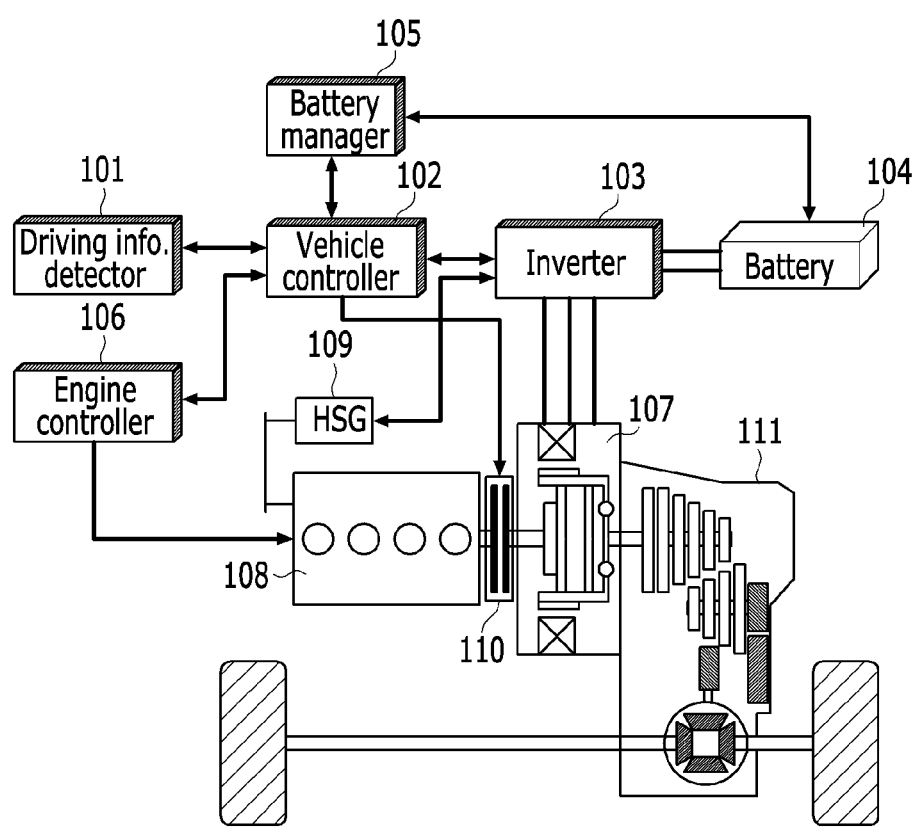
FIG. 1 is a drawing of a hydraulic pressure instruction-learning apparatus of a hybrid vehicle according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification. Further, in the drawings, each element is arbitrarily illustrated for convenience of description, and the present disclosure is not necessarily limited to those illustrated in the drawings.

FIG. 1 is a drawing of a hydraulic pressure instruction-learning apparatus of a hybrid vehicle according to an exemplary embodiment of the present disclosure.

Referring to FIG. 1, an exemplary embodiment of the present disclosure includes a driving information detector 101, a vehicle controller 102, an inverter 103, a battery 104, a battery manager 105, an engine controller 106, a motor 107, an engine 108, a hybrid starter and generator (HSG) 109, an engine clutch 110, and a transmission 111.

The driving information detector 101 detects overall driving information including a vehicle speed, a road gradient, a displacement amount of an accelerator pedal (opening), a rotational speed of an input shaft of the transmission 111, an oil temperature of the transmission 111, etc. so as to provide it to the vehicle controller 102.

As a top-level controller, the vehicle controller 102 provides integrated control of controllers that are connected to a network.

When an electric vehicle (EV) mode needs to be switched to a hybrid electric vehicle (HEV) mode due to information on a driving-required torque that the driving information detector 101 provides, information on a state of charge (SOC) of the battery 104 that the battery manager 105 provides, etc., the vehicle controller 102 turns on the engine 108, and allows the engine clutch 110 to be engaged between the engine 108 and the motor 107 through the clutch controller 106 to drive in the HEV mode.

When a launch control condition is satisfied, and launch is required in a stationary state, the vehicle controller 102 operates the HSG 109 to turn on the engine 108, controls the engine 108 in an idle state, determines an acceleration speed of the hybrid vehicle by an input amount of the accelerator pedal, converts the acceleration speed into a transmission gear ratio, and determines a target speed of the input shaft of the transmission 111.

The launch control refers to control of the vehicle in which a frictional torque of the engine clutch 110 is used to launch the vehicle, when the motor 107 cannot output sufficient driving power due to the SOC of the battery 104, the road condition, the road gradient, etc.

After determining a hydraulic pressure profile that can track the target speed of the input shaft of the transmission 111, the vehicle controller 102 outputs a hydraulic pressure instruction and then allows the hydraulic pressure to engage the engine clutch 110.

The vehicle controller 102 detects output performance of the engine clutch 110 that transmits a revolution per minute (RPM) of the engine 108 as the engine clutch 110 is engaged, and compares the output performance with a predetermined target output performance.

That is, as the engine clutch 110 is engaged, the vehicle controller 102 detects a real rotational speed inputted to the input shaft of the transmission 111 and compares the real rotational speed with the predetermined target speed.

Figure 3:
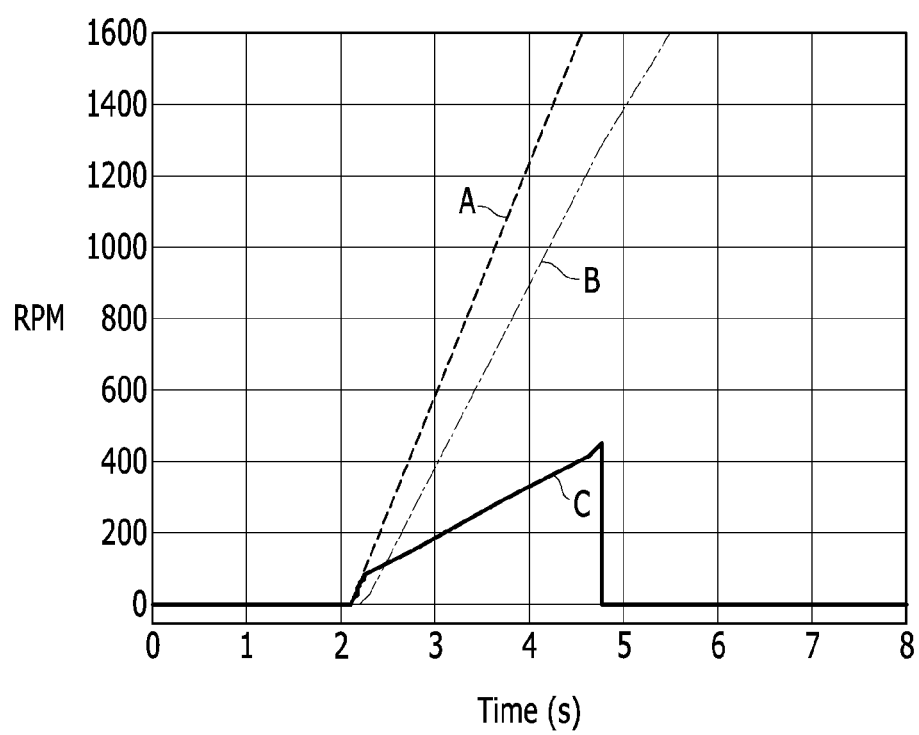
FIG. 3 is a drawing illustrating a performance error of an engine clutch in the hybrid vehicle according to the exemplary embodiment of the present disclosure.

As shown in FIG. 3, the vehicle controller 102 detects real output performance (B) inputted to the input shaft of transmission 111 and predetermined dynamic target performance (A), and extracts a performance error function (C) if a performance error therebetween exceeds a predetermined allowable error range.

The performance error function represents a difference between the target dynamic performance and the real performance. A negative (−) value means a state of the real rotational speed being faster than a target rotational speed and a positive (+) value means a state of the target rotational speed being faster than the real rotational speed when the real rotational speed that is inputted to the input shaft of the transmission 111 is subtracted from when the target rotational speed of the input shaft of the transmission 111, which is defined as the target dynamic performance.

The vehicle controller 102 compares the real rotational speed inputted to the input shaft of the transmission 111 and the predetermined target rotational speed, and separates the performance error function with an initial error if the performance error exceeds the predetermined allowable error range.

The vehicle controller 102 defines an initial hydraulic pressure for starting the engagement of the engine clutch as a first-order component, a range corresponding to a slope as a second-order component, and a range corresponding to the curvature as a third-order element, such that compensation points of the hydraulic pressure instruction are changed depending on the components of the respective orders.

The vehicle controller 102 adjusts the hydraulic pressure instruction depending on the compensation points thereof that are divided according to error components of the respective orders, and analyzes performance variation according to the adjusted hydraulic pressure instruction, thereby learning to correct the hydraulic pressure instruction of the engine clutch 110 that tracks a target time and a target speed.

The vehicle controller 102 learns and stores the hydraulic pressure instruction of the engine clutch 110 in its memory as in a map form, depending on the oil temperature of the transmission 111, the road gradient, and the displacement amount (opening) of the accelerator pedal.

When there is no learned hydraulic pressure instruction of the engine clutch 110, the vehicle controller 102 inputs the displacement amount (opening) of the accelerator pedal and a target speed profile according thereto to a required torque map of a driver, as a baseline for the hydraulic pressure instruction, for initial learning values which are applied to be learned and corrected.

The inverter 103, which are formed by a plurality of power switching elements, converts a DC voltage from the battery 104 into a three-phase AC voltage according to a control signal from the vehicle controller 102, and controls driving of the motor 107.

The power switching element forming the inverter 103 may be any one of an insulated gate bipolar transistor (IGBT), a metal-oxide-semiconductor field-effect transistor (MOSFET), a transistor, and a relay.

The inverter 103 includes a protective circuit. The protective circuit monitors power flows, distributes or cuts off the power when an overvoltage or overcharge is introduced into the power source due to various causes such as a vehicle collision, etc., to protect the overall systems that are provided in the hybrid vehicle, and protects passengers on board against a high voltage.

The battery 104 consists of a plurality of unit cells, and the high voltage is stored therein to provide the voltage to the motor 107.

The battery manager 105 detects currents, voltages, and temperatures of the respective cells in an operating region of the battery 104 to control the SOC, and controls charging and discharging voltages of the battery 104, such that over-discharge below a lower threshold voltage or over-charge above an upper threshold voltage can be prevented to prevent the lifespan of the battery 104 from being shortened.

The engine controller 106 controls an operation of the engine 108 according to the control signal that is applied from the vehicle controller 102 through a network.

The motor 107 is operated with the three-phase AC voltage from the inverter 103 and generates torque, and is operated as a generator in coast-down to provide regenerative energy to the battery 104.

The engine 108 outputs a first power as a power source in a turned-on state of the engine 108.

The HSG 109 operates as an electric motor according to the control signal from the vehicle controller 102 to turn on the engine 108, operates as a generator to generate a voltage while the engine 108 maintains the turned-on state, and provides the generated voltage to the battery 104 as a charging voltage through the inverter 103.

The engine clutch 110 is disposed between the engine 108 and the motor 107 and delivers or cuts off the power of the engine 108, thereby enabling driving of the vehicle in the EV mode or the HEV mode.

The engine clutch 110 may consist of a wet-type multi-plate clutch that delivers an output torque of the engine 108 to the motor 107 with a frictional force due to the hydraulic pressure, and driving performance may be dependent upon the hydraulic pressure instruction.

The transmission 111 is provided as an automatic transmission or a continuous variable transmission (CVT), and engagement elements and disengagement elements are operated by the hydraulic pressure such that a target gear shift stage is combined.

In the hybrid vehicle configured to include the above functions according to the present disclosure, an operation of controlling an engine clutch is performed will be described hereinafter.

Figure 2:
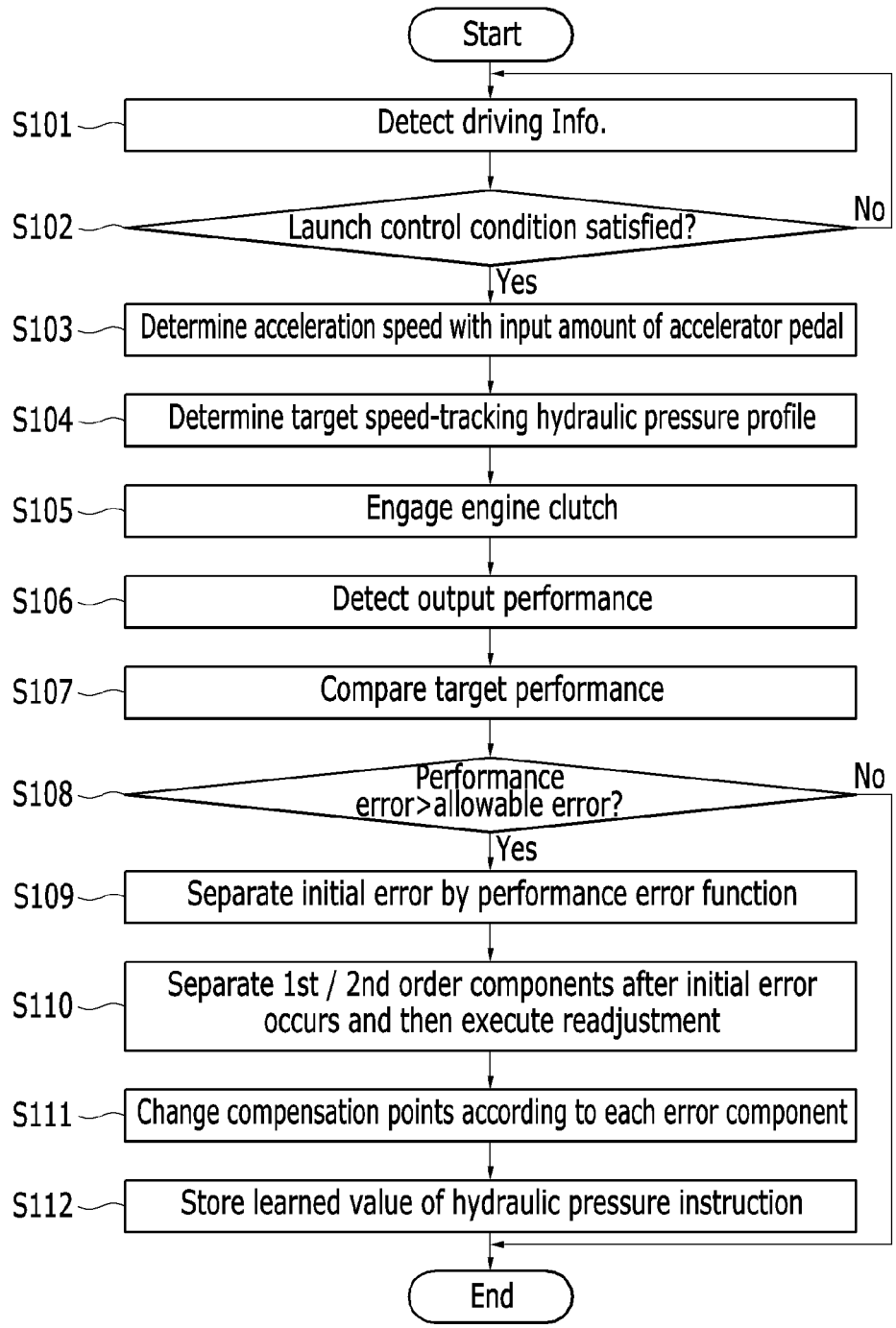
FIG. 2 is a flowchart schematically illustrating a hydraulic pressure instruction-learning process of a hybrid vehicle according to an exemplary embodiment of the present disclosure.

FIG. 2 is a flowchart schematically illustrating a hydraulic pressure instruction-learning process of a hybrid vehicle according to an exemplary embodiment of the present disclosure.

In the hybrid vehicle to which the present disclosure is applicable, a vehicle controller 102 detects overall driving information including a vehicle speed, a road gradient, a displacement amount of an accelerator pedal (opening), etc. (S101), and determines whether a launch control condition is satisfied or not (S102).

The launch control condition means a control condition in which the vehicle is launched by utilizing a frictional torque of the engine clutch 110 when the motor 107 cannot output sufficient driving power because of the SOC of the battery 104, a road condition, the road gradient, etc.

When the launch control condition is satisfied in step S102, the vehicle controller 102 allows the HSG 109 to turn on the engine 108, controls the engine 108 in an idle state, and determines acceleration speed of the hybrid vehicle with an input amount of the accelerator pedal (S103).

The vehicle controller 102 converts the determined acceleration speed in step 103 into a transmission gear ratio to determine a target speed of the input shaft of a transmission 111, and determines a hydraulic pressure profile that can track the target speed (S104).

The vehicle controller 102 outputs the determined hydraulic pressure profile in step S104 as the hydraulic pressure instruction, such that the hydraulic pressure is operated to engage the engine clutch 110 (S105).

In step S105, the vehicle controller 102 detects a real rotational speed, which is output performance that transmits an RPM of the engine 108 as the engine clutch 110 is engaged, that is inputted to the input shaft of the transmission 111 (S106), and compares the real rotational speed with a predetermined target output performance (S107).

The vehicle controller 102 compares the inputted real rotational speed of the input shaft of the transmission 111 in step S107 with the predetermined target rotational speed, and determines whether a performance error exceeds a predetermined allowable error (S108).

The vehicle controller 102 extracts a performance error function in step 108 when the performance error exceeds the predetermined allowable error, and uses the performance error function to separate an initial error therefrom if the performance error exceeds the predetermined allowable error (S109).

As can be seen in FIG. 3, the vehicle controller 102 detects real output performance (B) inputted to the input shaft of the transmission 111 and predetermined dynamic target performance (A), and extracts the performance error function (C) if the performance difference therebetween exceeds the predetermined allowable error range.

When the performance error function is approximated as a quadratic function, the performance error function represents a difference between the target dynamic performance and the real performance. A negative (−) value means a state of the real rotational speed being faster than the target rotational speed, and a positive (+) value means a state of the target rotational speed being faster than the real rotational speed when the real rotational speed that is inputted to the input shaft of the transmission is subtracted from the target rotational speed of the input shaft of the transmission, which is defined as the target dynamic performance.

When the performance error function is approximated as the quadratic function, the vehicle controller 102 defines an initial hydraulic pressure corresponding to an offset as a first-order component, a range corresponding to a slope as a second-order component, and a range corresponding to the curvature as a third-order element, such that compensation points of the hydraulic pressure instruction are changed depending on the components of the respective orders (S110).

Because an equation of motion for the power transmission system of the vehicle in a rotational direction can be linearly expressed as $T = I\omega$ (where T is a torque, I is a moment of inertia, and $\omega$ is an angular acceleration), as each component of the error is expressed as an error function by the principle of superposition, a linear combination of error-related input parameters is used to find an input for generating full-order error functions.

The vehicle controller 102 adjusts the hydraulic pressure instruction according to the compensation points thereof that are separated based on the respective error components in step S110, analyzes corresponding performance variation, and learns to correct the hydraulic pressure instruction of engine clutch 110 that can track the target time and the target speed (S111).

Figure 4:
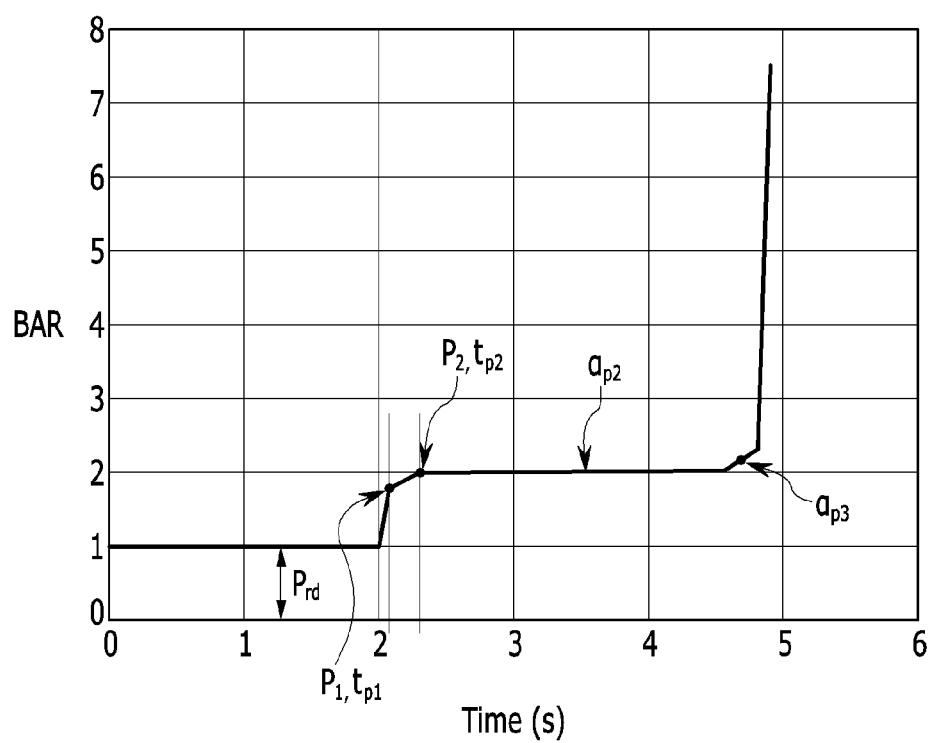
FIG. 4 is a drawing illustrating a hydraulic pressure instruction for engaging the engine clutch in the hybrid vehicle according to the exemplary embodiment of the present disclosure.

The vehicle controller 102, for example, as can be seen in FIG. 4, sets to learn the compensation points in the hydraulic pressure instruction profile as will be described hereinafter.

The compensation points may be set to, for example, a preliminary pressure $P_{rd}$ in which the engine clutch 110 waits to be engaged, an initial hydraulic pressure $P_1$ in which the engine clutch 110 starts to be engaged, a compensation hydraulic pressure $P_2$ in which the engine clutch 110 is being engaged, a hydraulic pressure slope $a_{P2}$ in which the engine clutch 110 is engaged to deliver torque, and a hydraulic pressure slope $a_{P3}$ right before completion of the engagement of the engine clutch 110.

Figure 5:
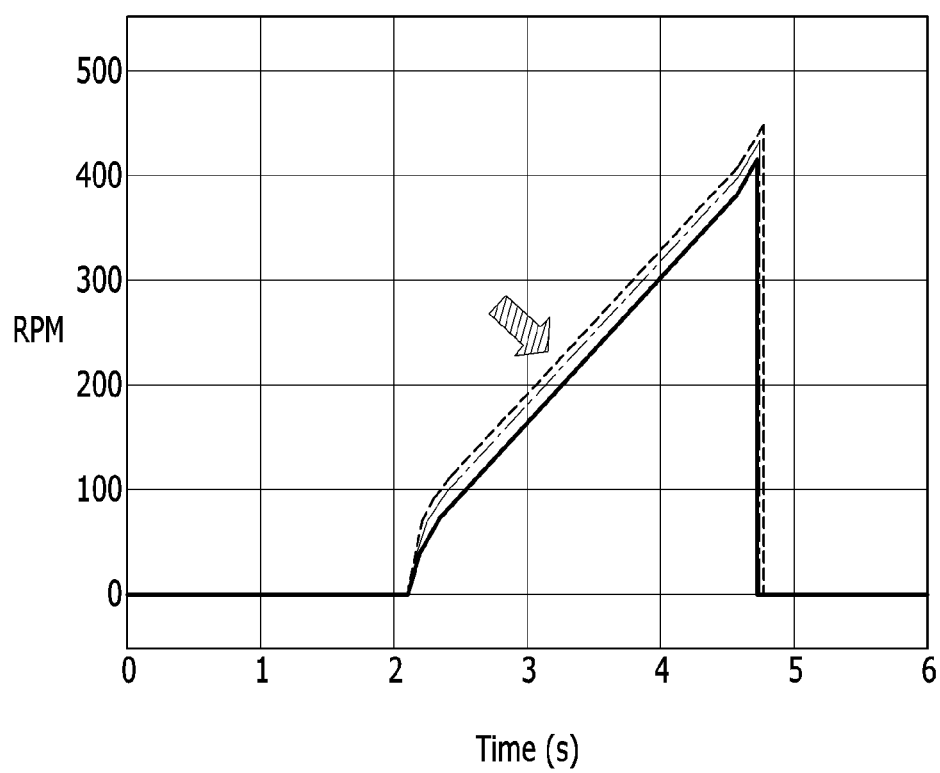
FIG. 5 is a drawing illustrating performance variation according to a preliminary hydraulic pressure adjustment illustrated in FIG. 4.

In FIG. 4, when a learning procedure, in which the preliminary pressure $P_{rd}$ is increased by a set value, for example, 0.5 bar each time, is performed, performance variation (i.e., variation of rotational speed characteristics inputted to the input shaft of transmission 111) occurs in an arrow direction as shown in FIG. 5.

Because an adjustment of the preliminary pressure $P_{rd}$ affects the first mode and further affects a filling time until a kiss-point pressure is reached, the preliminary pressure $P_{rd}$ is maintained at 90% of the kiss-point in consideration of initial performance improvement and a measurement error.

Figure 6:
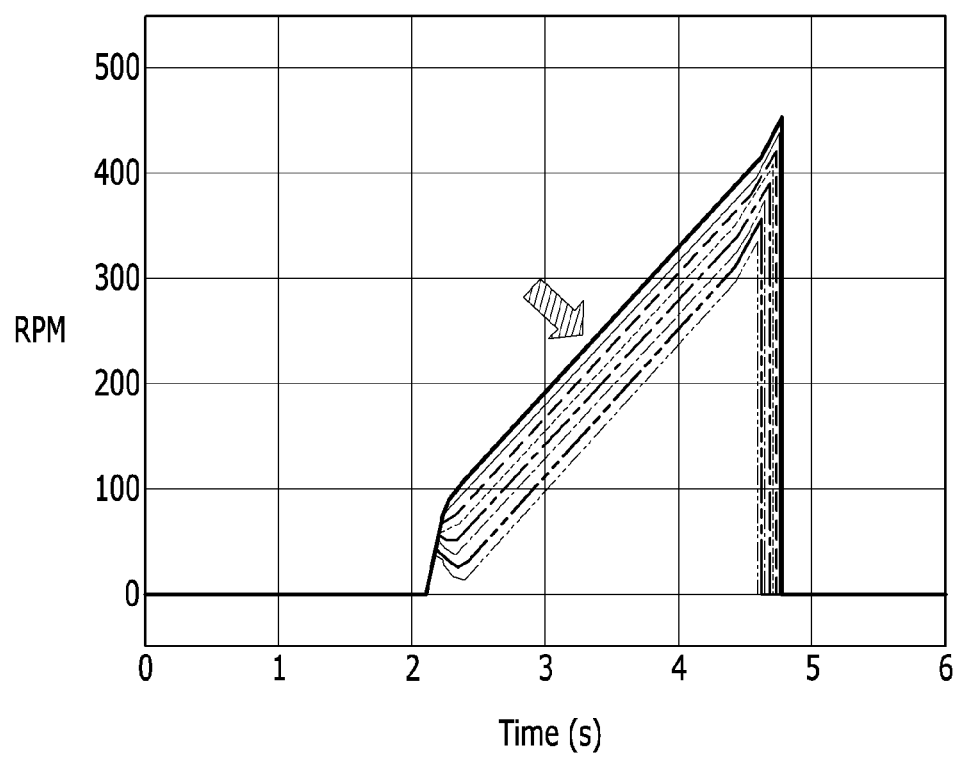
FIG. 6 is a drawing illustrating performance variation according to an initial hydraulic pressure adjustment illustrated in FIG. 4.

Further, in FIG. 4, when a learning procedure, in which the initial hydraulic pressure $P_1$ is increased by a set value, for example, 0.5 bar each time, is performed, performance variation (i.e., variation of rotational speed characteristics inputted to the input shaft of transmission 111) occurs in an arrow direction as shown in FIG. 6. The adjustment of the initial pressure $P_1$ has a dominant effect on the first mode.

Figure 7:
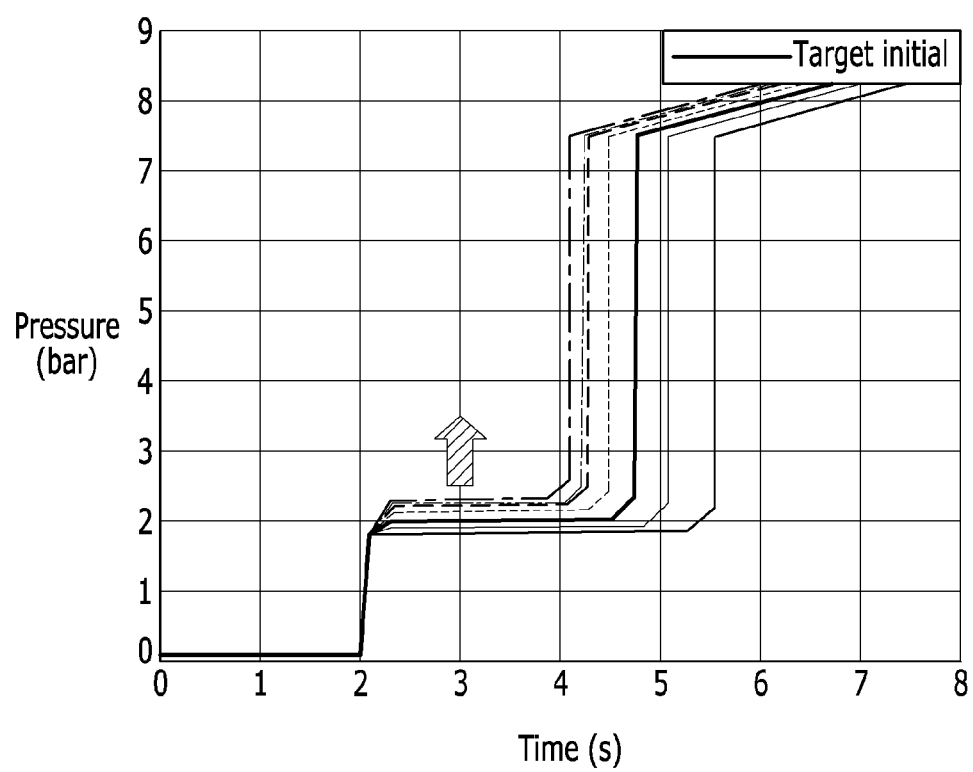
FIG. 7 is a drawing showing a compensated hydraulic pressure adjustment illustrated in FIG. 4.
Figure 8:
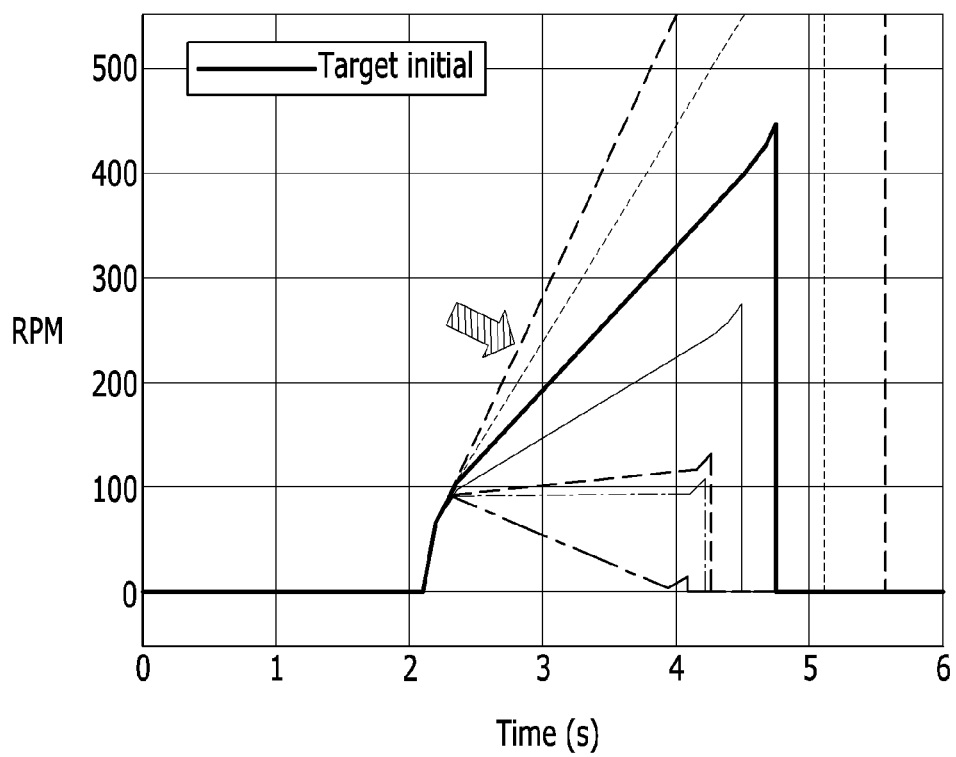
FIG. 8 is a drawing illustrating performance variation according to compensated hydraulic pressure adjustment illustrated in FIG. 7.

Further, in FIG. 4, when a learning procedure, in which the compensation hydraulic pressure $P_2$ is increased by a set value as can be seen in FIG. 7, is performed, performance variation (i.e., variation of rotational speed characteristics inputted to the input shaft of transmission 111) occurs in an arrow direction, as shown in FIG. 8.

According to a relationship between pressure, torque, and speed, it can be seen that the performance error linearly varies because, if an average pressure provided to the engine clutch 110 increases, an average transfer torque increases and an acceleration of an output shaft is increased.

Figure 9:
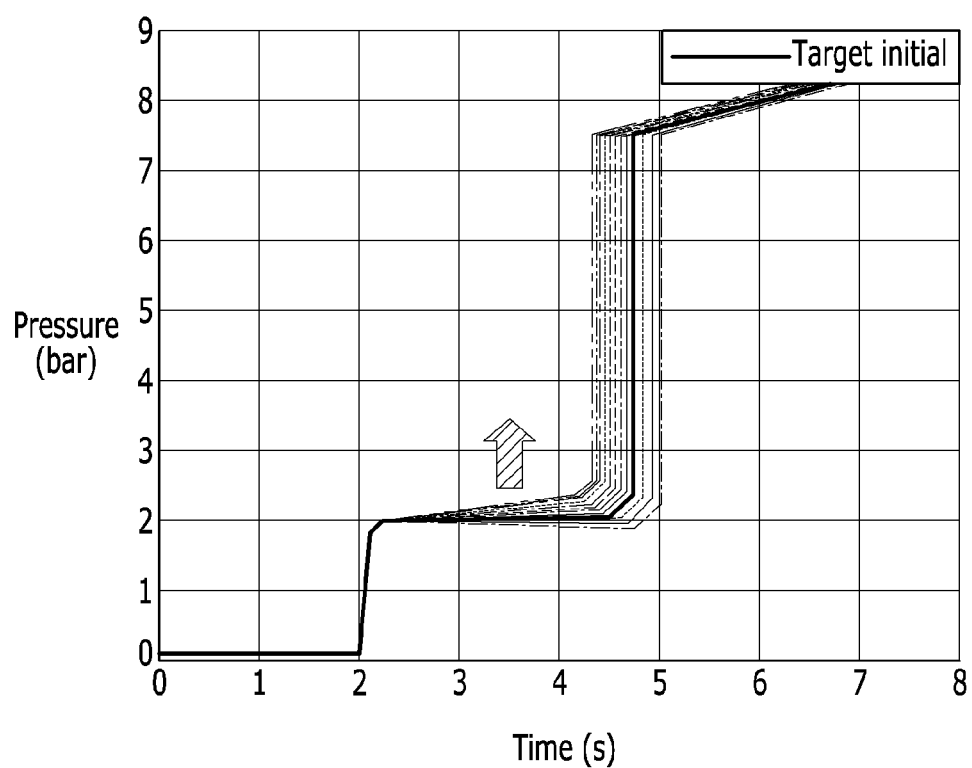
FIG. 9 is a drawing illustrating a hydraulic pressure adjustment in a torque transfer range illustrated in FIG. 4.
Figure 10:
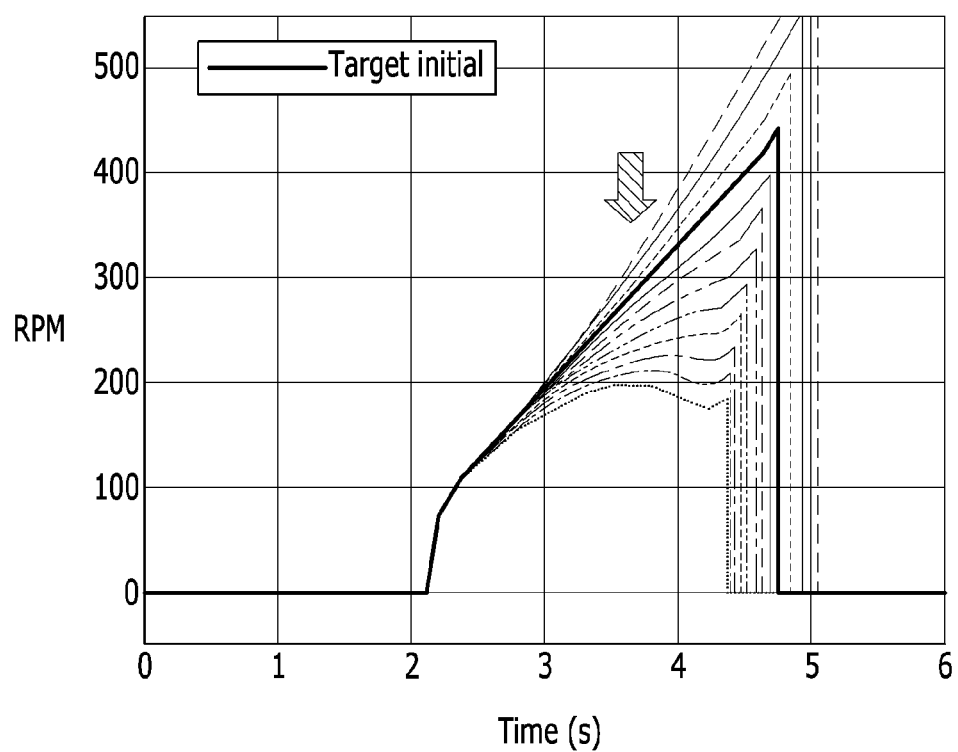
FIG. 10 is a drawing illustrating performance variation according to the hydraulic pressure adjustment of the torque transfer range illustrated in FIG. 9.

Referring to FIG. 4, when a learning procedure, in which the hydraulic pressure slope $a_{P2}$ is increased by a set value as can be seen in FIG. 9, is performed, performance variation (i.e., variation of rotational speed characteristics inputted to the input shaft of transmission 111) occurs in an arrow direction as shown in FIG. 10.

Slope variation of the pressure may be defined as slope variation of the torque, the slope variation of the torque may be defined as slope variation of the acceleration, and the slope variation of the acceleration may be defined as curvature component variation of the speed.

Figure 11:
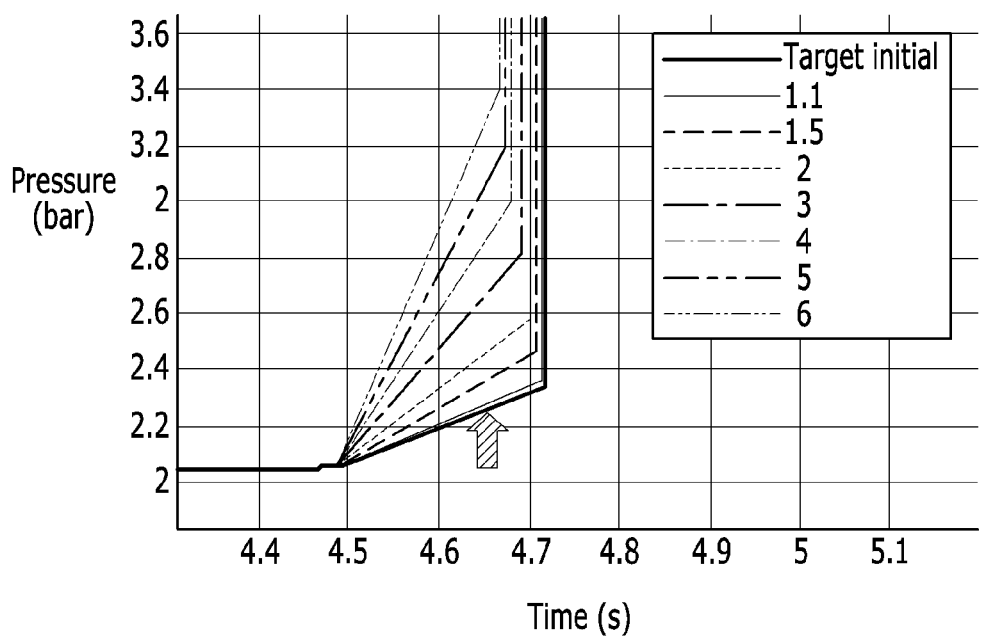
FIG. 11 is a drawing illustrating performance variation according to control variable adjustments illustrated in FIG. 4.

When a learning procedure in FIG. 4, in which the hydraulic pressure slope $a_{P3}$ is increased by a set value, is performed, performance variation (i.e., variation of rotational speed characteristics inputted to the input shaft of transmission 111) occurs in an arrow direction as shown in FIG. 11.

The hydraulic pressure slope $a_{P3}$ does not affect tracking of the target speed much, but does affect the engagement of the engine clutch 110, which allows performance error compensation according to characteristic variation of a friction coefficient.

Accordingly, after separating error functions according to their error modes when an error occurs in the hydraulic pressure instruction of the engine clutch 110, the vehicle controller 102 corrects the initial hydraulic pressure $P_1$ if an initial error corresponding to the first mode exceeds a predetermined allowable range such that the initial hydraulic pressure $P_1$ falls within the allowable range, and stores the initial hydraulic pressure $P_1$ as a learned value if the initial error not exceed the predetermined allowable range.

When a linear error of the second-order component corresponding to the slope in the hydraulic pressure instruction of the engine clutch 110 exceeds the predetermined allowable range, the vehicle controller 102 corrects the compensation pressure $P_2$ such that the compensation pressure $P_2$ falls within the allowable range, and stores the compensation pressure $P_2$ as the learned value if the linear error does not exceed the predetermined allowable range.

Further, when a curvature error of the third-order component corresponding to a torque transfer range of the engine clutch 110 exceeds the predetermined allowable range, the vehicle controller 102 corrects the hydraulic pressure slope $a_{P2}$ such that the hydraulic pressure slope $a_{P2}$ falls within the allowable range, and stores the hydraulic pressure slope $a_{P2}$ as the learned value if the curvature error does not exceed the predetermined allowable range.

In addition, when a peak slope at the engagement exceeds the predetermined allowable range because of friction characteristic variation of the engine clutch 110, the vehicle controller 102 corrects the hydraulic pressure slope $a_{P3}$ such that the hydraulic pressure slope $a_{P3}$ falls within the predetermined allowable range, and stores the slope $a_{P3}$ as the learned value if the peak slope does not exceed the predetermined allowable range.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydraulic pressure instruction-learning apparatus of a hybrid vehicle, comprising:
   a power source including an engine and a motor;
   an engine clutch disposed between the engine and the motor; and
   a vehicle controller configured to output a hydraulic pressure instruction to control engagement/disengagement of the engine clutch,
   wherein the vehicle controller compares output performance of the engine clutch with predetermined dynamic target performance in a launch control, extracts a performance error function if a difference therebetween exceeds a predetermined allowable error range, and corrects the output performance of the engine clutch such that the output performance falls within the predetermined allowable error range and is stored as a learned value.

2. The apparatus of claim 1, wherein the vehicle controller sets a control, in which a friction torque of the engine clutch is used to run the vehicle when the motor is unable to output a sufficient driving power, as the launch control.

3. The apparatus of claim 1, wherein the vehicle controller approximates the performance error function as a quadratic function to define an initial hydraulic pressure for initiating the engagement of the engine clutch as a first-order component, a slope as a second-order component, and a curvature as a third-order component, sets compensation points of the hydraulic pressure instruction according to the respective components of the corresponding orders, compensates performance errors for the respective compensation points, and stores a compensated value as the learned value of the hydraulic pressure instruction of the engine clutch.

4. The apparatus of claim 1, wherein the vehicle controller separates the performance error function according to respective components to determine compensation points of the hydraulic pressure instruction, analyzes performance variation according to correction of the hydraulic pressure instruction, and stores a corrected value as the learned value of the hydraulic pressure instruction if the performance variation falls within the predetermined allowable error range.

5. The apparatus of claim 1, wherein the vehicle controller learns the hydraulic pressure instruction according to an oil temperature of a transmission, a road slope, and a displacement amount (opening) of an accelerator pedal, and stores the learned value in a map form.

6. An apparatus of claim 1, wherein the vehicle controller determines an acceleration of the vehicle by an input amount of an accelerator pedal in the launch control, converts the acceleration into a transmission gear ratio to determine a target speed of an input shaft of a transmission, and determines a target speed-tracking hydraulic pressure instruction to control the engagement of the engine clutch.

7. The apparatus of claim 1, wherein the vehicle controller determines a displacement amount (opening) of an accelerator pedal and a target speed according thereto as an initial hydraulic pressure instruction, when there is the learned value of the hydraulic pressure instruction of the engine clutch.

8. The apparatus of claim 1, wherein the vehicle controller corrects an initial hydraulic pressure such that the initial hydraulic pressure falls within an allowable range if an initial error of a first-order component corresponding to start of engaging the engine clutch exceeds the predetermined allowable error range, and stores the initial hydraulic pressure as the learned value of the initial hydraulic pressure if the initial error does not exceed the predetermined allowable error range.

9. The apparatus of claim 1, wherein the vehicle controller corrects a compensated hydraulic pressure such that the compensated hydraulic pressure falls within an allowable range if a linear error of a second-order component corresponding to a slope in the hydraulic pressure instruction for engaging the engine clutch exceeds the predetermined allowable error range, and stores the compensated hydraulic pressure as the learned value if the linear error does not exceed the predetermined allowable range.

10. The apparatus of claim 1, wherein the vehicle controller corrects a hydraulic pressure slope at a torque transfer range of the engine clutch such that the hydraulic pressure slope falls within an allowable range if a curvature error of a third-order component corresponding to the torque transfer range exceeds the predetermined allowable error range, and stores the hydraulic pressure slope at the torque transfer range as the learned value if the curvature error does not exceed the predetermined allowable error range.

11. The apparatus of claim 1, wherein the vehicle controller corrects a hydraulic pressure slope right before completion of the engagement of the engine clutch within an allowable range if a peak slope at the engagement of the engine clutch exceeds the predetermined allowable error range because of a friction characteristic variation of the engine clutch, and stores the hydraulic pressure slope right before the completion of the engagement as the learned value if the peak slope does not exceed the predetermined allowable error range.

12. A hydraulic pressure instruction-learning method of a hybrid vehicle, comprising steps of: turning on an engine in an idle state when a launch control condition is satisfied and determining an acceleration of the vehicle with an input amount of an accelerator pedal; converting by a vehicle controller, the acceleration into a transmission gear ratio to determine a target speed of an input shaft of a transmission, determining a hydraulic pressure instruction for tracking the target speed, and controlling engagement of an engine clutch; comparing by a vehicle controller, an output speed of the engine clutch with the target speed of the input shaft of the transmission to determine whether or not a performance error exceeds a predetermined allowable error range; approximating by a vehicle controller, a performance error function by using a quadratic function to divide it into respective components and determining the divided components as compensation points of the hydraulic pressure instruction; and adjusting by a vehicle controller, the hydraulic pressure instruction according to the respective compensation points to analyze output performance variation of the engine clutch and storing the corresponding hydraulic pressure instruction as a learned value if the output performance of the engine clutch tracks the target speed of the input shaft of the transmission.

13. The method of claim 12, wherein the launch control condition refers to a control condition of launching the vehicle by using a friction torque of the engine clutch if a motor is unable to output a sufficient driving power because of a state of charge (SOC) of a battery, a road condition, or a road gradient.

14. The method of claim 12, wherein the performance error function is approximated as the quadratic function such that an initial hydraulic pressure corresponding to start of the engagement of the engine clutch is defined as a first-order component, a range corresponding to a slope of the quadratic function is defined as a second-order component, and a range corresponding to a curvature of the quadratic function is defined as a third-order component.

15. The method of claim 12, wherein an initial hydraulic pressure is corrected such that the output performance of the engine clutch tracks the target speed if an error of a first-order component corresponding to start of engaging the engine clutch exceeds the predetermined allowable error range, and the initial hydraulic pressure is stored as the learned value if the error does not exceed the predetermined allowable error range.

16. The method of claim 12, wherein a compensated hydraulic pressure is corrected such that the output performance of the engine clutch tracks the target speed if a linear error of a second-order component corresponding to a slope in the hydraulic pressure instruction for engaging the engine clutch exceeds the predetermined allowable error range, and the compensated hydraulic pressure is stored as the learned value if the linear error does not exceed the predetermined allowable error range.

17. The method of claim 12, wherein a hydraulic pressure slope is corrected such that the output performance of the engine clutch tracks the target speed if a curvature error of a third-order component corresponding to a torque transfer range of the engine clutch exceeds the predetermined allowable error range, and the hydraulic pressure slope at the torque transfer range is stored as the learned value if the curvature error does not exceed the predetermined allowable error range.

18. The method of claim 12, wherein a hydraulic pressure slope right before completion of the engagement is corrected such that the output performance of the engine clutch tracks the target speed if a peak slope at the engagement of the engine clutch exceeds the predetermined allowable error range because of friction characteristic variation of the engine clutch, and the hydraulic pressure slope right before the completion of the engagement is stored as the learned value if the peak slope does not exceed the predetermined allowable error range.

\* \* \* \* \*